Sept. 26, 1950     R. J. VEDOVELL     2,523,604
SEAL
Filed Feb. 14, 1947
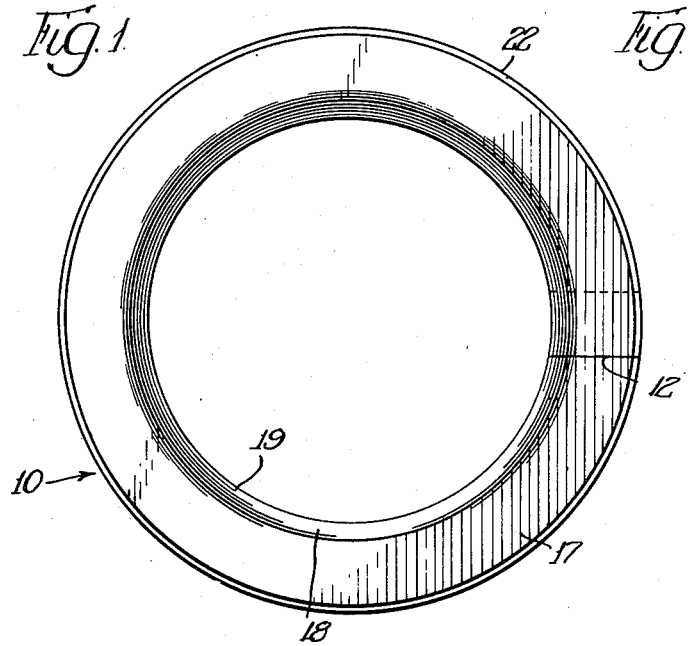
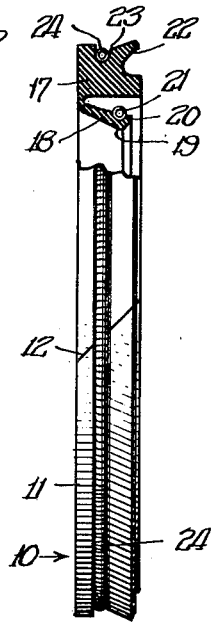
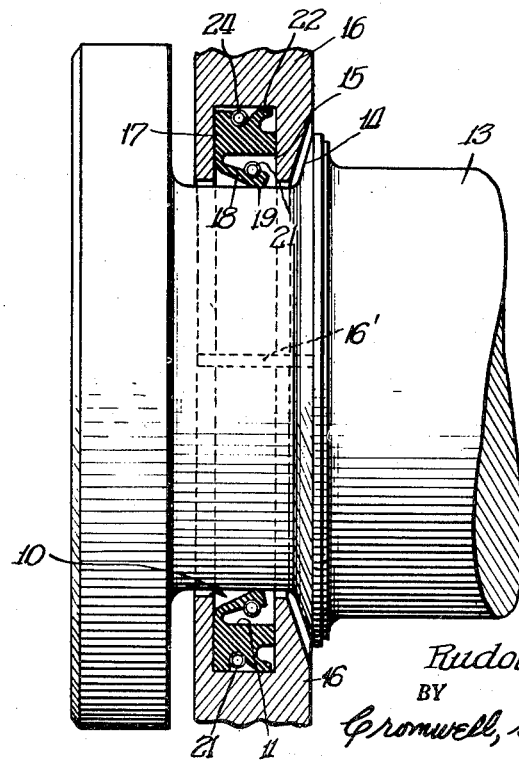
INVENTOR.
Rudolph J. Vedovell,
BY
Cromwell, Greist & Warden

UNITED STATES PATENT OFFICE 2,523,604

SEAL

Rudolph J. Vedovell, Kenilworth, Ill., assignor to Chicago Rawhide Manufacturing Company, Chicago, Ill., a corporation of Illinois Application February 14, 1947, Serial No. 728,646

3 Claims. (Cl. 288—2)

This invention pertains to improvements in an oil seal of a type adapted for association with a pair of relatively movable parts to seal against leakage therebetween; and in particular, it relates to a split type seal adapted to be disposed in a grooved annular retainer means for sealing coaction with a relatively rotatable part, for example, a crank shaft, adjacent an end bearing of the latter.

It is an object of the invention to provide an annular seal of the foregoing type having a spring urged, radially acting sealing lip or flange adapted to effect a running seal with a shaft at the internal periphery of the seal, and sealing means also acting radially for insuring a fixed sealing engagement with the above mentioned retainer, in which the seal is disposed, as in a groove in said retainer.

More particularly, it is an object to provide a split rear crank shaft seal, adapted to be disposed in the annular recess or groove of a retaining ring, plate or the like to seal against loss of engine oil, said seal being provided with a radially acting sealing lip on one peripheral surface thereof, coacting with the shaft, and a further integral annular sealing element on the opposed peripheral surface thereof adapted to effect fixed sealing engagement with the retaining ring or plate, without requiring impractical axial thrust means.

A still further object is to provide a seal of the type described which is split for ready assembly relative to a crankshaft or other similar, specially conformed rotating part and which has plural, radially acting means insuring sealing engagement with the associated parts, together with further radially acting, constrictive spring means to maintain the seal in operative position prior to and during assembly.

Other objects and advantages of the invention will be apparent to those skilled in the art upon an understanding of a preferred embodiment thereof as shown in the accompanying drawings and described in the specification as follows.

In the drawings,

Fig. 1 is a face view illustrating the improved split seal according to the invention;

Fig. 2 is a view in end elevation, partially broken away and in radial section to illustrate certain structural details of the seal; and Fig. 3 is a fragmentary view in radial section through a seal in accordance with the invention, as operatively installed in relation to a rotatable shaft such as a crankshaft and a securing or retaining ring or plate receiving the seal.

This invention relates particularly to a split rear crankshaft seal of a type adapted to be associated with the crank shaft adjacent an end bearing thereof in order to prevent leakage of lubricants axially of the shaft, although it will be evident that the seal is well adapted for use in connection with other sorts of special conformed shafts or rotating members, and also in conjunction with other mounting provisions than are hereinafter described. It is contemplated that the seal be held in operative relation to the shaft by means of a two-part retaining plate or ring carrying an internal annular recess in which the seal is received; accordingly, the invention provides a split seal characterized by means for effecting a leak-proof running seal at the rotating shaft surface, as well as a fixed seal of a novel type with relation to the seal receiving recess referred to, all to the end that axial leakage of lubricants or other liquid and escape from the crank shaft housing is prevented throughout the life of the installation.

Referring to the drawings, the reference numeral 10 generally designates the seal of the invention. This assembly comprises an integral one-piece packing 11 which is angularly split at 12 to enable its ready disposition in encircling relation to a crankshaft 13, in an external annular recess 14 adjacent one end of said shaft. The packing is mounted in an internal annular groove 15 in a pair of coacting semi-circular retainer ring members 16 gasketed at the joint 16', whereby the packing is maintained in proper radial relation to the shaft for sealing.

The packing 11 per se includes generally rectangular body 17 of block-like section, which is preferably fabricated of a suitable synthetic rubber compound, in view of the conditions to which it is subject in operation. On one edge of its internal periphery body 17 is provided with a flexible, re-entrant, radially and axially extending sealing flange 18 adapted for running sealing engagement with the bottom of recess 14 in the rotating shaft. In the relaxed condition of the packing, prior to assembly on the shaft, the radially innermost portion thereof is of somewhat smaller diameter than that of the shaft groove, said portion terminating radially in a feathered sealing lip 19. Radially outwardly of lip 19 and within the re-entrant space defined thereby, the flange is molded to provide an annular concave seat 20 for an annular coiled garter spring 21, which spring exerts radially constrictive action on flange 18 to maintain sealing pressure on lip 19 throughout the life of the seal.

The external periphery of the packing 17 is molded to provide a further, radially and axially outwardly tapered sealing lip 22, behind which an annular seat 23 is formed in the material of the packing to receive a second annular coiled garter spring 24. The sole function of spring 24 is to hold the packing 17 in the desired relation of its parts in a radial plane, as shown in Fig. 2, after positioning thereof around the shaft and while the retaining plates 16 are telescoped over the seal.

In view of the fact that seal 10 is wholly housed in the internal groove 15 of the aforesaid retainer, in which it has a snug fit, it is impractical to provide means in said groove to exert axial sealing pressure of any element of the packing against the groove. Therefore, in order to effect a sealing action with reference to the retainer, I employ the outwardly angled sealing lip 22. Referring to Fig. 2, it will be noted that this lip is of somewhat greater diameter at its extremity than the remainder of the packing, being also of greater diameter in the relaxed position thereof than the normal diameter of the retainer groove 15. Hence, when assembled, the lip 22 is substantially compressed in the manner illustrated in Fig. 3 and thereafter functions to prevent leakage at this point, without requiring any special spring or other means for that purpose. Lip 19 exerts effective running sealing action at the shaft. Hence, the simple self-contained assembly insures effective sealing action between the seal shaft and retainer; and the parts are held in the desired relation prior to and during assembly on the shaft, by means of spring 24, so that accidental displacement at this time, with consequent imperfect sealing action, is prevented.

I claim:

1. A seal comprising an annular, transversely split, body of flexible non-metallic material of substantial radial and axial thickness, said body having an integral, radially extending, flexible sealing flange projecting radially inwardly relative to an internal margin thereof and an integral annular lip projecting outwardly relative to an external margin thereof, said lip and flange being of substantially less cross-sectional thickness than said body, the radially outer surface of said body being provided with an external circumferential groove located inwardly of said lip, and an annular spring disposed in said groove inwardly of said lip to encircle said body and hold the same in annular form.

2. A seal comprising an annular, transversely split, body of flexible non-metallic material of substantial radial and axial thickness, said body having an integral, radially and axially extending, flexible sealing flange projecting radially inwardly relative to an internal margin thereof and an integral annular lip projecting in the opposite radial direction relative to an external margin thereof, said lip and flange being of substantially less cross-sectional thickness than said body, the radially outer surface of said body being provided with an external circumferential groove located inwardly of said lip, and an annular spring disposed in said groove inwardly of said lip to encircle said body and hold the same in annular form.

3. A seal comprising an annular, transversely split, block-like body of flexible non-metallic material of substantial radial and axial thickness, said body having an integral, annular, radially and axially extending sealing flange projecting radially inwardly from the internal periphery thereof and an integral annular lip projecting outwardly therefrom in the opposite radial direction, said lip and flange being of substantially less cross-sectional thickness than said body, the radially outer surface of said body being provided with an external circumferential groove located inwardly of said lip, a spring engaging said flange to urge the same radially against a part to be sealed, and a second spring of annular shape disposed in said groove inwardly of said lip to encircle said body and hold the same in annular form.

RUDOLPH J. VEDOVELL.

REFERENCES CITED

The following references are of record in the file of this patent:

UNITED STATES PATENTS

| Number | Name | Date |
|---|---|---|
| 1,251,807 | Mongan | Jan. 1, 1918 |